United States Patent [19]

Landa

[11] 4,193,674
[45] Mar. 18, 1980

[54] MICROFILM CAMERA ATTACHMENT

[76] Inventor: Jeffrey B. Landa, Microfilm Associates Co., Inc., 7101 York Ave. S., Edina, Minn. 55435

[21] Appl. No.: 919,818

[22] Filed: Jun. 28, 1978

[51] Int. Cl.² .............................................. G03B 7/00
[52] U.S. Cl. ........................................ 354/59; 355/68
[58] Field of Search ................... 354/49, 59, 42, 23 R, 354/295; 355/68; 350/315, 318; 356/225

[56] References Cited

U.S. PATENT DOCUMENTS

| | | | |
|---|---|---|---|
| 2,024,661 | 12/1935 | Riszdorfer | 354/49 |
| 2,124,286 | 7/1938 | Burckhardt | 354/295 X |
| 3,649,120 | 3/1972 | Pfeifer et al. | 355/68 |
| 3,795,445 | 3/1974 | Hamlin et al. | 355/68 |
| 4,000,497 | 12/1976 | Galbraith, Jr. | 354/59 X |
| 4,066,346 | 1/1978 | Toyama et al. | 354/59 X |

*Primary Examiner*—John Gonzales
*Attorney, Agent, or Firm*—Williamson, Bains, Moore & Hansen

[57] ABSTRACT

A conventional portable microfilming camera having a generally fixed exposure is improved for use with slower films which are required for x-ray duplication. The improvement consists of placing a neutral density filter over the exposure controlling photocell thereby reducing the amount of light reaching the photocell. This in turn results in a longer period of time being required for the pre-set amount of light to reach the photocell thereby causing a longer exposure time as required by the slower film. A light table is provided for back-lighting the x-rays and selectively sized masks are hingedly affixed to the light table for selective masking of the unused portion of the light table. A beam restrictor is used in conjunction with the neutral density filter to ensure that the photocell does not view the uncovered portion of the light table.

2 Claims, 4 Drawing Figures

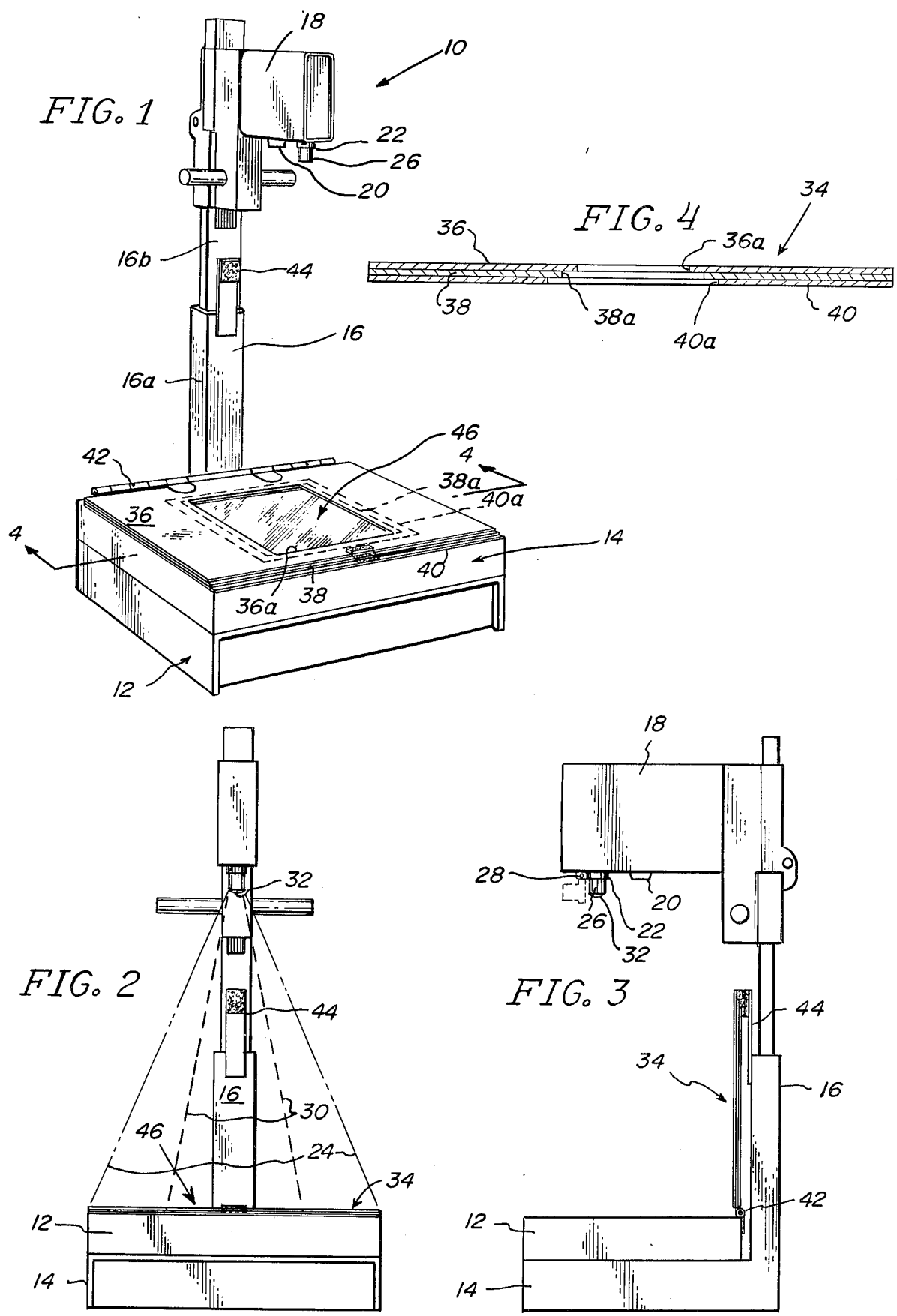

MICROFILM CAMERA ATTACHMENT

BACKGROUND OF THE INVENTION

In recent years, hospitals have found it increasingly cumbersome to store x-rays in their original form. While there is definite need for retention of such records, it has been found expeditious to transfer such records to microfilm in order to minimize the storage space required. One problem with microfilming such records is that it is preferable not to remove the x-rays from the premises while the microfilming is taking place as such records could be required at any time. This presents a problem to those wishing to perform the microfilming operation as the only cameras that are presently suited to such work, in view of the high resolution and detail required, are not easily portable for use at the jobsite. On the other hand, those microfilming cameras which are portable are not suited for use in x-ray duplication as they are not suited for use with the slow films required in the duplication process. These cameras have in general a fixed rate of exposure designed for a particular film designated by the manufacturer. While the photocell may allow for some adjustability, automatically or otherwise, in view of the lightness or darkness of the subject matter, such range is generally not designed for use with slower speed film.

SUMMARY OF THE INVENTION

It is therefore an object of this invention to provide a means for adapting presently existing portable microfilming cameras for use in x-ray duplication. It is a further object of this invention to provide such an adaptation that may be easily, quickly, and inexpensively maintained while at the same time allowing the camera to be returned to its original configuration or mode for more conventional microfilming processes.

The device of the instant invention involves modification of a conventional microfilming camera. The base of the camera apparatus is provided with a light table on which the x-rays to be duplicated are placed. A plurality of masks are hingedly attached to the table and may be selectively swung into position in order to cover the portion of the light table not covered by the x-ray to be duplicated. Such masking is desirable for several reasons in that the bright light from the light table is offensive to the operator of the machine and also such light will adversely influence the exposure control device in the camera by inducing a false reading. The succession of masks are provided with different size openings corresponding to the various sizes of x-rays to be duplicated. Those masks not in use are held up and out of the way by a Velcro fastener or the like.

The camera head is generally provided with a lens and separate electric eye or photocell which serves to open the shutter for the required length of time. This length of time is generally governed by the film for which the camera is designed. Thus, a light or dark image to be recorded will result in slightly varying exposure times. On the other hand, however, apart from this minimal compensation, no real provision for adjustment is provided so that the slow films required for x-ray duplication can be utilized. To this end, a small tube having a neutral density filter at its outer end is placed over the electric eye. This tube may be hingedly attached so that it may be swung out of the way in order to use the camera in its conventional mode. The neutral density filter cuts down on the amount of light impinging upon the photocell and thus with the same amount of subject illumination will hold the shutter open longer in order that the photocell circuit may actually receive the same quanta of light as is normally required to trigger the shutter. The cylindrical tube also serves, in addition to mounting the neutral density filter, to act as a "blinder" for the photocell in that it restricts the view of the photocell to the central portion of the light table where there is always a covered portion of the x-ray. In other words, this serves to prevent the photocell from "seeing" the uncovered portions of the light table which are quite bright in relation to the subject matter to be duplicated, thereby preventing false readings.

These and other objects and advantages of this invention will more fully appear from the foregoing description made in connection with the accompanying drawings, wherein like reference characters refer to the same or similar parts throughout the several views.

BRIEF DESCRIPTION OF THE DRAWINGS

FIG. 1 is a perspective view of the instant invention.

FIG. 2 is a front plan view of the invention showing the fields of view of the photocell.

FIG. 3 is a side plan view of the instant invention.

FIG. 4 is a sectional view of the masks taken along lines 4—4 of FIG. 1.

DESCRIPTION OF THE PREFERRED EMBODIMENT

The camera device of the instant invention, generally designated 10, is comprised of a base 12 having located on top thereof a light table 14. A telescoping neck 16 is mounted at the rear of base 12 and extends upwardly. Two neck portions 16A and 16B telescope to vary the reduction ratio of the camera device. A camera head 18 is mounted at the top of upper telescoping neck section 16B and contains the film and camera unit for the microfilming device.

Located on the lower side of camera head 18 and facing downwardly towards light table 14 are lens 20 of camera 18 and photocell 22. The normal or unrestricted field of vision 24 of photoelectric cell 22 is indicated and shown in FIG. 2 and comprises generally the entire upward facing surface of the light table 14 or base 12. A cylindrical beam restrictor tube 26 is mounted over the photoelectric cell 22 and is hingedly attached by means of hinge mechanism 28. Beam restrictor tube 26 may be swung out of the way as shown in phantom in FIG. 3 if desired. Beam restrictor tube 26 effectively acts as a blinder to photoelectric cell 22 and allows it to view only the central area of the light table and items located thereon. The restricted field of vision is shown at 30 in FIG. 2. This region of the light table 14 will always be covered by an x-ray and thus extraneous light from portions of the light table uncovered will not enter the photoelectric cell and induce a false reading thereby causing an improper exposure.

A neutral density filter 32 is affixed in the end of beam restrictor tube 26. Such filters are well known to those skilled in the art and may be affixed to tube 26 by adhesives, a screw fitting, or any other well known means.

A successive masking device 34 is attached at the rear of light table 14. Three successively sized masks 36, 38 and 40 are hingedly attached at hinge 42 to the rear of light table 14. The mask with the largest opening is located at the bottom of the stack and successively smaller apertures 36A, 38A and 40A are located thereabove. The masks are sized so as to properly mask the most common sized x-rays as for instance 8×10, 10×12, and 11×14. Of course, other sized masks may be employed as so desired depending on the sizes of the x-rays to be duplicated. Masks 36, 38 and 40 serve to cut down on the bright light from the light table and impinging upon the operator's eyes as well as cutting down on extraneous light which might tend to induce false readings in the photoelectric cell 22 even with use of the beam restrictor tube 26. The subject area for the camera is designated 46 in FIGS. 1 and 2. Velcro-type fasteners 44 may be utilized to hold the unused masks in an upright position as shown in FIG. 3. When it is desired to use a mask, the x-ray is first placed on the light table and then the appropriate sized mask is swung downwardly into position where it rests upon the table. For example, were an 11×14 x-ray to be duplicated, only mask 40 would be swung downwardly and thereby properly framing the x-ray to be duplicated. Were an 8×10 x-ray to be duplicated, the whole stack of masks 36, 38 and 40 would be swung downwardly with the 8×10 aperture 36A of mask 36 acting properly to mask the x-ray. By using the conveniently hinged and arranged mask arrangement, loose masks need not lay about but instead are easily stored and then utilized to effect the masking process.

In particular, a camera designed to use a particular film would use an ND-3 neutral density filter in order to in effect, "fool" the exposure mechanism. Such a filter has the same effect as stopping down the camera by 3 f-stops thereby allowing the use of the slower film suitable for x-ray duplication.

While the preferred embodiments of the present invention have been described, it should be understood that various changes, adaptations and modifications may be made therein without departing from the spirit of the invention and the scope of the appended claims.

What is claimed is:

1. In combination with a camera designed for use with a standard film said camera being of the type having a lens and photocell which opens a shutter until a predetermined quanta of light from the subject area has entered said photocell, said predetermined quanta being nonadjustable; a photocell intake modifying device comprising:

a neutral density filter having an operative position located in the optical path between the subject area and said photocell, said filter being of a density sufficient so that by the time said predetermined quanta of light has entered said photocell, said shutter has been open long enough so that a film slower than said standard film may be properly exposed; and a cylindrical tube hingedly attached to said camera adjacent said photocell and having an axis coincident with said optical path, said tube being of a length and diameter so that only light incident from the subject area to be photographed will enter said photocell.

2. The combination of claim 1 wherein said filter is located at the end of said tube opposite said photocell.

* * * * *